US 9,101,867 B2

(12) United States Patent
Laurila

(10) Patent No.: US 9,101,867 B2
(45) Date of Patent: Aug. 11, 2015

(54) APPARATUS AND METHOD FOR REMOVING DIRT FROM GAS FLOW

(71) Applicant: ABB Oy, Helsinki (FI)

(72) Inventor: Risto Laurila, Espoo (FI)

(73) Assignee: ABB OY, Helsinki (FI)

( * ) Notice: Subject to any disclaimer, the term of this patent is extended or adjusted under 35 U.S.C. 154(b) by 130 days.

(21) Appl. No.: 13/737,639

(22) Filed: Jan. 9, 2013

(65) Prior Publication Data

US 2013/0174735 A1   Jul. 11, 2013

(30) Foreign Application Priority Data

Jan. 11, 2012   (EP) ..................... 12150758

(51) Int. Cl.
*B01D 46/00* (2006.01)
*B01D 46/26* (2006.01)

(52) U.S. Cl.
CPC ........ *B01D 46/0056* (2013.01); *B01D 46/0045* (2013.01); *B01D 46/0071* (2013.01); *B01D 46/0072* (2013.01); *B01D 46/0073* (2013.01); *B01D 46/0083* (2013.01); *B01D 46/26* (2013.01); *B01D 2279/45* (2013.01)

(58) Field of Classification Search
CPC ................... B01D 45/14; B01D 46/45–46/46; B01D 46/56; B01D 46/67; B01D 46/83; B01D 46/521–46/52; B01D 46/24113
USPC ........... 55/277, 400, 471, 473, 507, 510, 511, 55/294; 15/347
See application file for complete search history.

(56) References Cited

U.S. PATENT DOCUMENTS

| 6,004,365 | A | 12/1999 | Fiacco |
| 6,348,086 | B1 | 2/2002 | Harms et al. |
| 6,372,005 | B1 | 4/2002 | Fiacco |
| 6,514,304 | B2 | 2/2003 | Fiacco |
| 2002/0069626 | A1* | 6/2002 | Fiacco ............... 55/400 |
| 2004/0177757 | A1 | 9/2004 | Bailey |
| 2007/0022720 | A1* | 2/2007 | Guertin .............. 55/289 |
| 2010/0132153 | A1* | 6/2010 | Leibold et al. ........ 15/347 |
| 2011/0286167 | A1* | 11/2011 | Winkler ........... 361/679.01 |

FOREIGN PATENT DOCUMENTS

| DE | 199 38 769 A1 | 3/2001 |
| WO | WO 01/60497 A1 | 8/2001 |
| WO | WO 2009/038326 A2 | 3/2009 |

OTHER PUBLICATIONS

European Search Report for EP 12150758 dated Jun. 27, 2012.

* cited by examiner

*Primary Examiner* — Jason M Greene
*Assistant Examiner* — Karla Hawkins
(74) *Attorney, Agent, or Firm* — Buchanan Ingersoll & Rooney PC

(57) ABSTRACT

The disclosure relates to a gas permeable wall for preventing dirt present in a gas flow from passing through the gas permeable wall with the gas flow. In order to minimize maintenance, the gas permeable wall is a circumferential wall of a cover, and an outlet from the cover is provided for passing on gas having entered the cover through the circumferential gas permeable wall. A support is provided for attaching the cover rotatably to a device, and a drive unit is provided for rotating the cover.

14 Claims, 2 Drawing Sheets

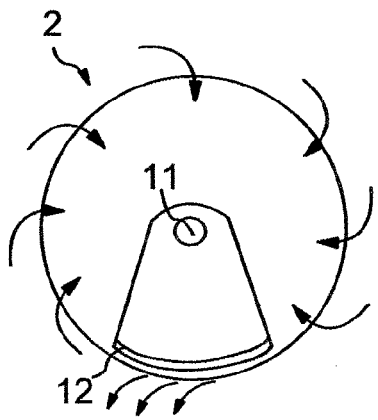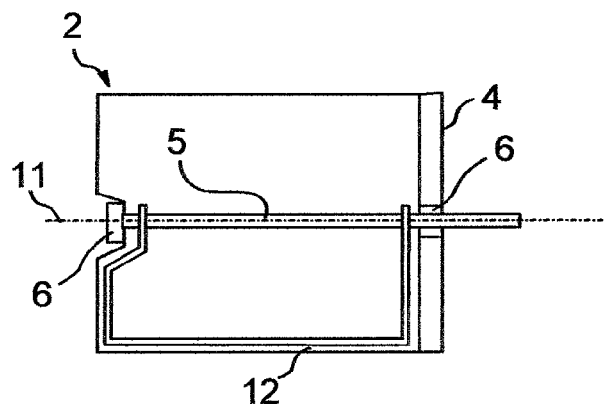
FIG. 4  FIG. 5
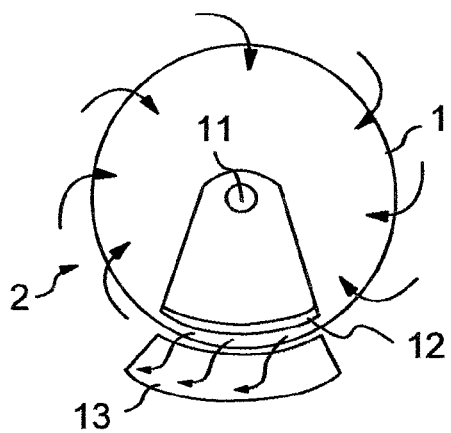
FIG. 6
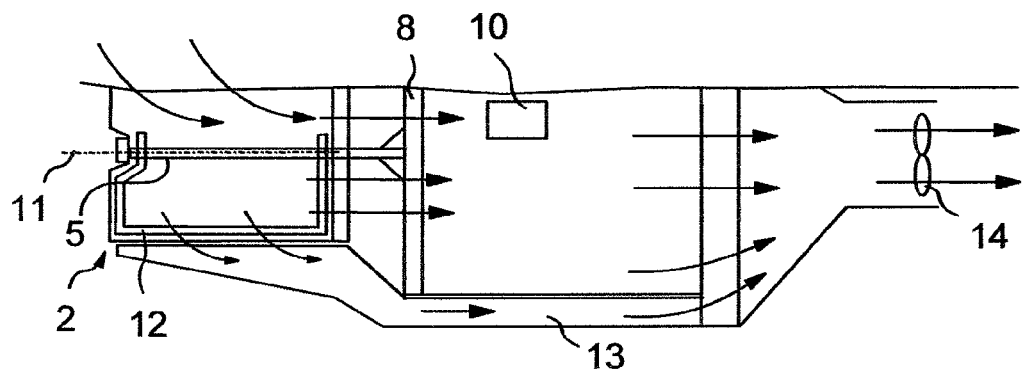
FIG. 7

APPARATUS AND METHOD FOR REMOVING DIRT FROM GAS FLOW

RELATED APPLICATION(S)

This application claims priority under 35 U.S.C. §119 to European Application No. 12150758.6 filed Jan. 11, 2012, the entire content of which is hereby incorporated by reference in its entirety.

FIELD

The present disclosure relates to an apparatus and to a method for removing dirt from a gas flow. The disclosure will be explained in connection with a cooling apparatus for an electronic cabinet, though exemplary embodiments can also be utilized for other purposes.

BACKGROUND INFORMATION

It is known to pass a gas flow through an air permeable wall to remove dirt from the gas flow. The gas permeable wall, such as a filter, can include holes or perforations of a size smaller than the size of the dirt particles. Consequently, the dirt particles are not capable of passing through the gas permeable wall together with the gas flow.

An issue involved with the above mentioned method is the need for maintenance. The dirt which is incapable of passing through the gas permeable wall can remain stuck to the wall and as the amount of dirt increases it can become difficult for the gas flow to pass through the layer of accumulated dirt.

In order to avoid the gas flow through the gas permeable wall decreasing; the accumulated dirt should be removed. This can be done by changing or cleaning the filter. In other words the gas permeable wall can involve maintenance personal to carry out the necessary tasks. In addition, the apparatus may need to be taken out of use for the time period necessary to carry out the maintenance tasks.

SUMMARY

An apparatus is disclosed including a gas permeable wall for preventing dirt present in a gas flow from passing through the gas permeable wall with the gas flow, the gas permeable wall being a circumferential wall of a cover arranged to rotate around a horizontal axis, an outlet from the cover for passing on gas having entered the cover through the circumferential gas permeable wall, a support for attaching the cover rotatably to a device having a cooling channel for cooling components such that gas will enter the cooling channel via the cover and a drive unit for rotating the cover.

A method is disclosed for removing dirt from a gas using a cover with a gas permeable circumferential wall that is arranged to rotate, the method including generating a gas flow by sucking gas from inside of the cover via an axial outlet of the cover, and removing dirt incapable of passing through the gas permeable internal wall from an outer surface of the gas permeable circumferential wall while the gas permeable circumferential wall rotates.

BRIEF DESCRIPTION OF THE DRAWINGS

In the following the present disclosure will be described by way of example with reference to the attached drawings, in which:

FIGS. 4 and 5 illustrate a second exemplary embodiment of an apparatus and of a method for removing dirt from gas;

FIG. 6 illustrates a third exemplary embodiment of an apparatus and of a method for removing dirt from gas; and FIG. 7 illustrates a fourth exemplary embodiment of an apparatus and of a method for removing dirt from gas.

DETAILED DESCRIPTION

Exemplary embodiments of the present disclosure provide a method and apparatus for removing dirt from a gas flow which can minimize the need for maintenance of the apparatus involved.

In an exemplary embodiment of the apparatus, a rotatable cover with a gas permeable circumferential wall is utilized to prevent dirt from passing with the gas flow. Rotation of the gas permeable circumferential wall makes it possible to obtain a situation where dirt can be removed from the gas permeable circumferential wall while the apparatus is in use.

Figure 1:
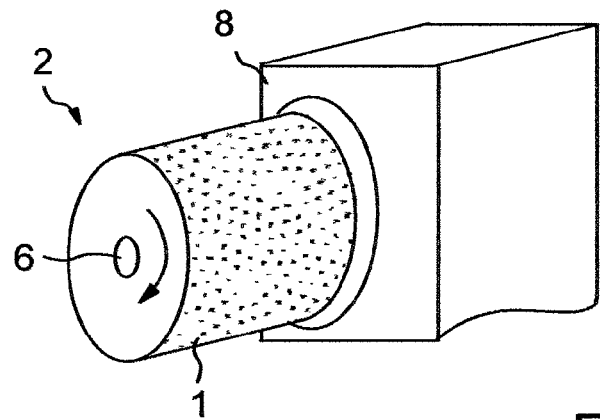
FIGS. 1 to 3 illustrate a first exemplary embodiment of an apparatus and of a method for removing dirt from gas.
Figure 2:
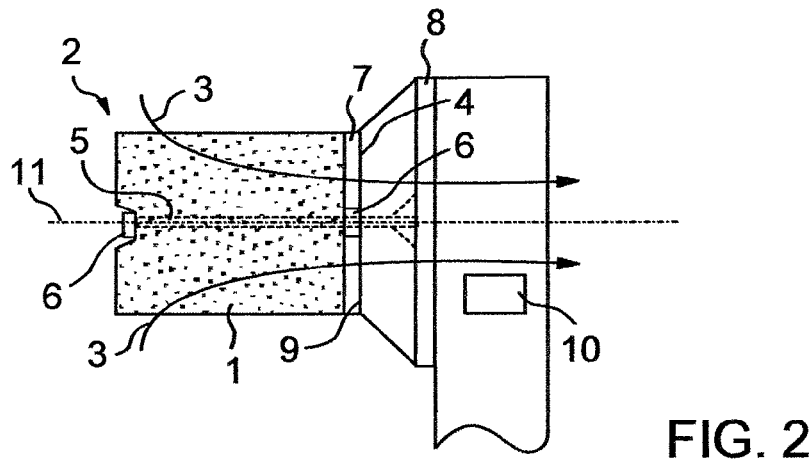
Figure 3:
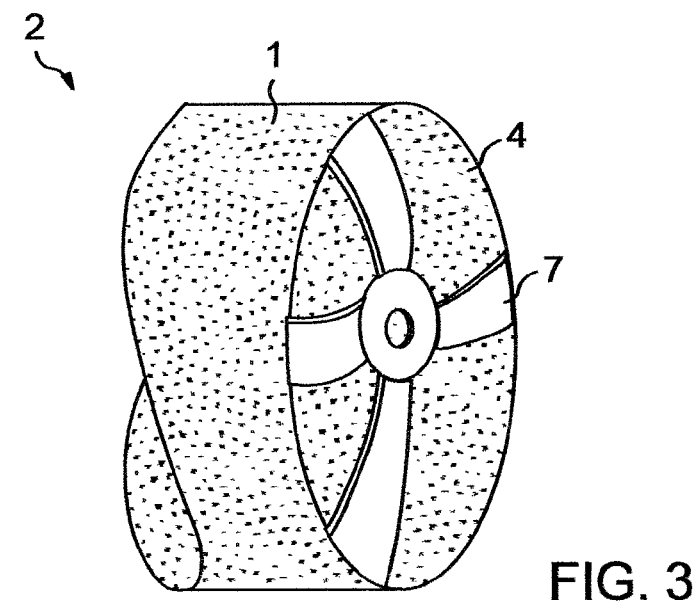

FIGS. 1 to 3 illustrate a first exemplary embodiment of an apparatus and of a method for removing dirt from gas. In the illustrated example, a gas permeable wall 1 has been arranged as a circumferential wall of a cover 2. A gas flow 3 can enter the interior of the cover 2 via holes or perforations in the circumferential wall and can pass on via an outlet 4 of the cover. The size of the holes or perforations in the gas permeable wall 1 is sufficiently small (for the intended use) to prevent dirt particles of a predetermined size from penetrating through the wall to the interior of the cover 2, and further via the outlet 4. The gas permeable wall therefore can act as a filter allowing gas to pass through it and preventing dirt from passing through it. In the exemplary embodiments the gas permeable circumferential wall 1 has been indicated to have a cylindrical shape, which in many cases is a desirable shape. However, also other shapes are possible, and the circumferential wall can even include a plurality of planar surfaces attached to each other such that their joining edges form corners.

The apparatus can include a support which rotatably attaches the cover 2 to a device 8. In an exemplary embodiment the support can include an axis 5 which is fixedly attached to the device 8 and bearings 6 allowing the cover 2 to rotate in relation to the axis 5. However, it should be observed that this is only one way of implementing the support in practice. Instead of the axis, the cover can be rotatably attached to the device 8 via a bearing arrangement arranged along the outer edges of the outlet 4, for example. In any case, the cover 2 encloses an inlet 9 to the device 8 such that any gas entering the device 8 via the inlet 9 is forced to flow through the gas permeable wall 1 of the cover 2. A gasket or some other sealing device can be utilized between the outer edges of the outlet 4 and the inlet 9, to avoid gas from leaking from the outside of the cover 2 into the inlet 9 at this location. The device 8 can be for example, an electrical cabinet containing electronic components 10 of a frequency converter, and the gas can include air flowing through the electrical cabinet in order to cool the electronic components.

In order to cause the cover 2 to rotate, the apparatus can include a drive unit. Any kind of drive such as a belt or cogwheel, for example that can be used in connection with an electric motor to cause the cover 2 to rotate, can be used as the drive unit in the apparatus. In an exemplary embodiment, the drive unit 7 includes rotor blades attached to the cover 2. The rotor blades are arranged on a flow path of the gas flow from the gas permeable wall 1 to the outlet 4. In this way the gas flow comes into contact with the rotor blades and energy transferred from the flowing gas to the rotor blades causes the cover 2 to rotate. Additional belts, cogwheels or other drive method are therefore not necessary in this embodiment.

The rotation of the cover 2 can be utilized for removing dirt accumulated on the outer surface of the gas permeable circumferential wall 1. By utilizing a firm non-organic 'filtering' material as the gas permeable wall in the cover from which dirt is quickly removed due to the rotation, damages due to moulding or corrosion, for example, can be efficiently prevented. In order to achieve an even more efficient dirt removal, the outer surface of the gas permeable wall 1 can be provided with a dirt repelling surface material or with a surface material preventing adhesion of dirt particles on the surface. One alternative is to utilize a layer of a sol-gel surface coating.

There exist several alternative ways to accomplish dirt removal by utilizing the rotation of the cover. A first alternative is to rotate the cover 2 at such a high rotation speed that centrifugal forces remove dirt from the outer surface of the gas permeable circumferential wall. Such a solution can be utilized irrespective of the position of the rotation axis around which the cover rotates. In other words, the rotation axis may be horizontal, as illustrated in FIGS. 1 to 3, vertical, or it can form any angle with the horizontal plane. The gas flow can in this case be generated by a fan located before the cover 2 (pushing gas towards the outside of the cover) or alternatively, by a fan located after the cover 2 (sucking gas from the inside of the cover). In order to enhance the dirt removal, the fan can occasionally be shut off, such that the gas flow through the gas permeable wall is temporarily interrupted. In that case, the cover 2 of the apparatus illustrated in FIGS. 1 to 3 can still continue to rotate for a while, during which time any dirt is efficiently removed from the outer surface of the gas permeable wall 1. A cleaning cycle, where the fan is shut off for a short period can be repeated sufficiently often to keep the outer surface of the cover clean. The fan can be temporarily shut off as often as once for each round that the cover rotates.

In case the cover 2 is supported to rotate around a horizontal rotation axis, the earth's gravity can enhance the cleaning.

FIGS. 4 and 5 illustrate a second exemplary embodiment of an apparatus and of a method for removing dirt from gas. The embodiment of FIGS. 4 and 5 is similar to the one disclosed in FIGS. 1 to 3. Therefore the embodiment of FIGS. 4 and 5 will be mainly explained by pointing out the differences.

In FIGS. 4 and 5, the apparatus includes a gas tight barrier 12 with a surface area smaller than the surface area of the gas permeable circumferential wall 1. The barrier 12 is arranged stationary inside the cover 2 in close proximity to the inner surface of the gas permeable circumferential wall 1. In the exemplary embodiment, the barrier 12, which is shaped as a curved plate extending along the inner surface of the gas permeable circumferential wall, is fixedly attached via shafts to the axis 5 such that it remains in the illustrated position under the horizontal rotation axis 11 of the cover 2 while the cover 2 rotates. The length of the barrier 12 in the direction of the rotation axis 11 can approximately correspond to the length of the gas permeable circumferential wall 1 in the direction of the rotation axis 11.

In the embodiment of FIGS. 4 and 5, a low pressure can be generated inside the cover. This low pressure can suck gas from the outside of the cover 2 through the gas permeable circumferential wall 1. However, at the location of the barrier 12, the barrier 12 can prevent gas flow through the gas permeable circumferential wall 1, as the low pressure can be prevented by the barrier from sucking in gas into the cover at the location of the barrier. Consequently centrifugal forces remove dirt from the outer surface of the gas permeable circumferential wall 1 at the location of the barrier plate, where an interruption in the gas flow occurs. In order for such cleaning to occur, it is not necessary that the rotation axis 11 is horizontal, but it may be vertical or form any angle with the horizontal plane. However, if the rotation axis is horizontal, then the removal of dirt can be even more efficient, as also the earth's gravity can, in that case, participate in removal of dirt when the barrier 12 is located under the rotation axis 11, as in the illustrated example.

FIG. 6 illustrates a third exemplary embodiment of an apparatus and of a method for removing dirt from gas. The embodiment of FIG. 6 is similar to the ones disclosed in the previous Figures. Therefore the embodiment of FIG. 6 will be mainly explained by pointing out the differences as compared to the previous embodiments.

In FIG. 6 the apparatus includes a low pressure cleaning channel 13 with an opening arranged in close proximity to a part of an outer surface of the gas permeable circumferential wall 1 for sucking dirt from the outer surface of the gas permeable circumferential wall 1. In such an embodiment the rotation axis may be horizontal, vertical or at any angle with the horizontal plane.

In order to enhance the removal of dirt, a barrier 12 similar to the one explained in connection with FIGS. 4 and 5, has been arranged stationary into the cover 2. In the exemplary embodiment, the barrier 12 is arranged between the opening of the cleaning channel 13 and the rotation axis 11 around which the cover 2 rotates. In this way, because of the barrier 12 the low pressure present inside the cover is not able to act against the gas permeable circumferential wall at the location of the barrier 12. Instead, at this location, the low pressure present in the cleaning channel 13 can efficiently remove dirt from the surface of the cover.

In FIG. 6 the cleaning channel 13 is located below the cover 2, and also the barrier 12 has been located below the rotation axis 11. In this way removal of dirt is accomplished both due to suction via the cleaning channel 13 and the earth's gravity. Additionally, dirt removal can be enhanced by centrifugal forces due to rotation of the cover. However, in another implementation it is possible to arrange the cleaning channel on top of the cover 2, and also the barrier 12 above the rotation axis 11, as sufficient dirt removal can be accomplished by the suction via the cleaning channel 13 alone.

FIG. 7 illustrates a fourth exemplary embodiment of an apparatus and of a method for removing dirt from gas. The embodiment of FIG. 7 is similar to the ones disclosed in the previous Figures. Therefore the embodiment of FIG. 7 will be mainly explained by pointing out the differences as compared to the previous embodiments.

FIG. 7 illustrates an embodiment where one single fan 14 is used for generating a cooling gas flow through the rotating air permeable circumferential wall of the cover 2 and the electronics cabinet of the device 8, such that electric components 10, are cooled by the flowing gas, which in this case includes air.

The cleaning channel 13 opens into a space where the fan 14 is located, such that the same fan can suck gas through the device 8 and dirt from the outer surface of the gas permeable circumferential wall of the cover 2, as has been explained in connection with FIG. 6.

In FIG. 7, the apparatus has been illustrated in a horizontal position, in other words, in a position where the rotation axis 11 of the cover 2 is horizontal, by way of example only. Alternatively, the device can be used in a vertical position or in a position where the rotation axis forms any angle with the horizontal plane. Additionally, as an alternative to the example illustrated in FIG. 7, the cleaning channel 13 can be located above the cover and the device 8, and not below as illustrated. In that case also the barrier 12 is located above the rotation axis 11 and not below, as illustrated.

It is to be understood that the above description and the accompanying figures are only intended to illustrate the present disclosure.

Thus, it will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. An apparatus, comprising:
    a gas permeable wall for preventing dirt present in a gas flow from passing through the gas permeable wall with the gas flow, the gas permeable wall being an outer surface of a circumferential wall of a cover arranged to rotate around a horizontal axis;
    an outlet from the cover configured for passing on gas having entered the cover through the gas permeable wall from an exterior of the cover to an interior of the cover;
    a support for attaching the cover rotatably to a device having a cooling channel for cooling components such that gas will enter the cooling channel via the cover; and
    a drive unit for rotating the cover.

2. The apparatus according to claim 1, wherein the drive unit comprises:
    rotor blades attached to the cover and arranged on a flow path of the gas flow from the gas permeable wall to the outlet for causing the cover to rotate by energy transferred from the gas flow to the rotor blades.

3. The apparatus of claim 1, wherein the cover encloses an inlet to the device in order to force gas entering the device via the inlet to pass through the gas permeable wall.

4. The apparatus according to claim 1, comprising:
    a gas tight barrier with a surface area smaller than a surface area of the gas permeable wall, the barrier being arranged stationary inside the cover in close proximity to the gas permeable wall for preventing a low pressure present inside the cover from causing gas to flow through the gas permeable wall at the location of the barrier.

5. The apparatus according to claim 4, wherein the barrier is arranged under a horizontal rotation axis around which the cover is arranged to rotate.

6. The apparatus according to claim 1, comprising:
    a low pressure cleaning channel with an opening arranged in close proximity to a part of an outer surface of the gas permeable wall for sucking dirt from the outer surface of the gas permeable wall.

7. The apparatus according to claim 1, comprising:
    a low pressure cleaning channel with an opening arranged in close proximity to a part of an outer surface of the gas permeable wall for sucking dirt from the outer surface of the gas permeable wall; and
    the barrier being arranged between the opening of the cleaning channel and the rotation axis around which the cover is arranged to rotate.

8. The apparatus according to claim 1, wherein the gas is air.

9. A method for removing dirt from a gas using a cover with a gas permeable outer surface of a circumferential wall that is arranged to rotate, the method comprising:
    generating a gas flow by sucking gas from inside of the cover via an axial outlet of the cover; and
    removing dirt incapable of passing through the outer surface of the gas permeable circumferential wall while the gas permeable wall rotates.

10. The method of claim 9, comprising:
    removing dirt by rotating the cover at a sufficient rotation speed for removing dirt from the outer surface by centrifugal forces.

11. The method of claim 9, comprising:
    rotating the cover around a horizontal axis; and
    utilizing gravitational forces to remove the dirt.

12. The method of claim 9, comprising:
    removing the dirt by sucking dirt from the outer surface of the gas permeable wall with a low pressure channel having an opening arranged in close proximity to the outer surface.

13. The method of claims 9, comprising:
    temporarily interrupting the gas flow through at least a portion of the gas permeable wall for enhancing dirt removal on an area of the outer surface.

14. The apparatus according to claim 1, in combination with an electronic cabinet, wherein the cooling channel is arranged to cool electric components located in the electronic cabinet.

* * * * *

UNITED STATES PATENT AND TRADEMARK OFFICE
CERTIFICATE OF CORRECTION

| | | |
|---|---|---|
| PATENT NO. | : 9,101,867 B2 | Page 1 of 1 |
| APPLICATION NO. | : 13/737639 | |
| DATED | : August 11, 2015 | |
| INVENTOR(S) | : Risto Laurila | |

It is certified that error appears in the above-identified patent and that said Letters Patent is hereby corrected as shown below:

Title Page, item (73) Assignee change "ABB OY" to --ABB TECHNOLOGY OY--.

Signed and Sealed this
Thirty-first Day of May, 2016

Michelle K. Lee
*Director of the United States Patent and Trademark Office*